May 30, 1950  F. L. BOYLAN  2,509,287
ELECTRIC MOTOR CONTROLLED VALVE
Filed Aug. 23, 1945  4 Sheets-Sheet 1

INVENTOR
F. L. Boylan
BY
ATTORNEYS

May 30, 1950  F. L. BOYLAN  2,509,287
ELECTRIC MOTOR CONTROLLED VALVE
Filed Aug. 28, 1945  4 Sheets-Sheet 2

INVENTOR
F. L. Boylan
BY
Glascock Downing Seibel
ATTORNEYS

May 30, 1950 F. L. BOYLAN 2,509,287
ELECTRIC MOTOR CONTROLLED VALVE
Filed Aug. 28, 1945 4 Sheets-Sheet 4

INVENTOR
F. L. Boylan
BY
ATTORNEYS

Patented May 30, 1950

2,509,287

UNITED STATES PATENT OFFICE 2,509,287

ELECTRIC MOTOR CONTROLLED VALVE

Francis L. Boylan, New Orleans, La.

Application August 28, 1945, Serial No. 613,102

4 Claims. (Cl. 318—160)

This invention relates to improvements in valves and operating means therefor, and more particularly to a device of this character designed for use in connection with a standpipe forming part of a tank filling system such as disclosed in the patent to C. R. McCauley and O. W. Page, No. 2,340,070, wherein the valve serves to close an overflow line to build up a high pressure while the tank is filling up, but, when the tank is full, automatically opens under the influence of some such reliable means as a spring or weight, thereby permitting reduction of the filling pressure in the main to a safe value.

The object of the invention is the provision of a valve wherein the closing movement is effected in dependence upon simultaneous energization of a motor and a magnetic clutch, the operation of the motor being interrupted under control of the movable valve member in the closed position thereof.

A further object is the provision of a valve and operating mechanism therefor wherein the clutch remains energized following the valve closing action of the motor and is effective in conjunction with the inactive motor drive to maintain the valve in closed position while the tank is filling.

A still further object is the provision of a motor operated valve which, when the clutch is deenergized, is automatically opened by means of a spring or weight and incident thereto the valve actuated motor control is conditioned to enable a subsequent operation of the motor under control of means located remotely from the valve.

In the accompanying drawing wherein an approved improvement of the invention is illustrated:

Figure 1:
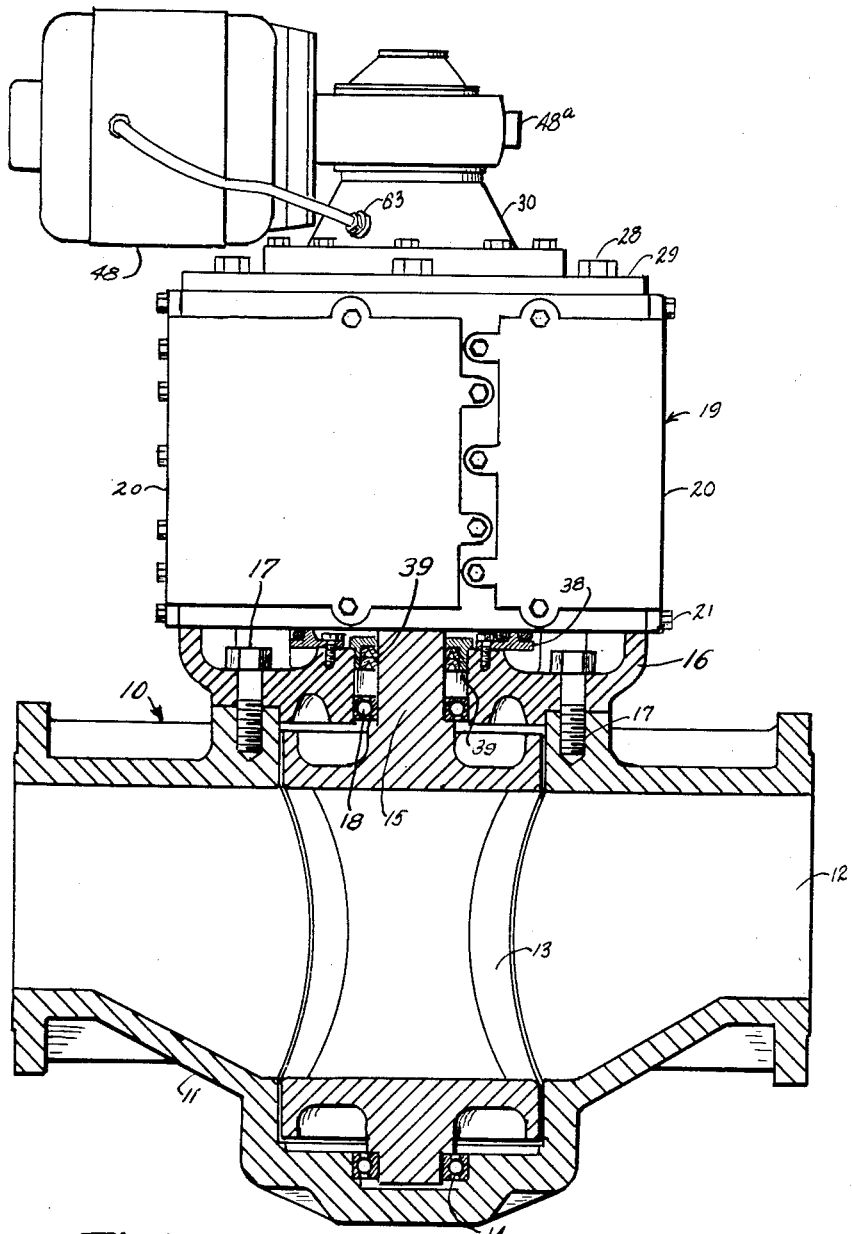
Fig. 1 is a longitudinal vertical section of the overflow line and the valve therein, and a side elevation of the operating means for the valve.
Figure 5:
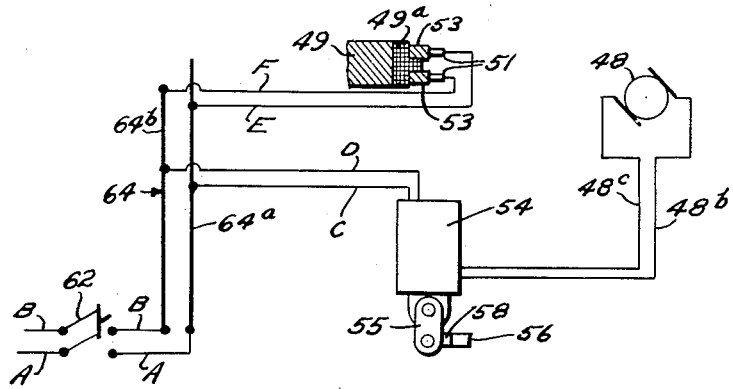
Fig. 5 is a diagram of the circuits for the electric current for the motor and the magnetic clutch.
Figure 2:
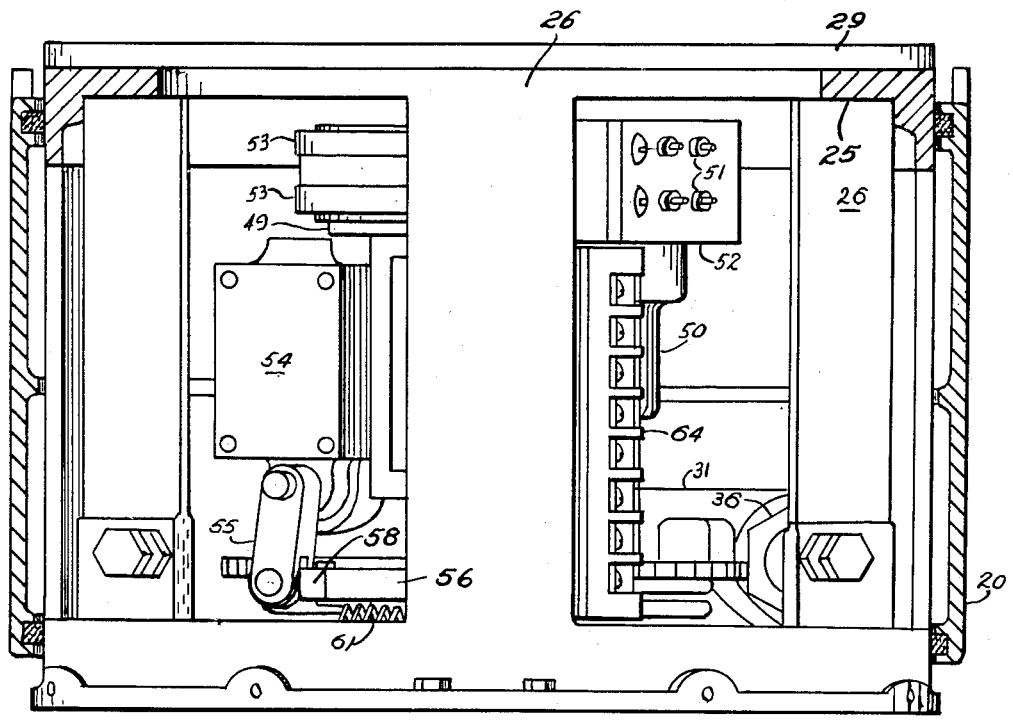
Fig. 2 is an enlarged side elevation of the operating means, its casing walls being broken away.
Figure 3:
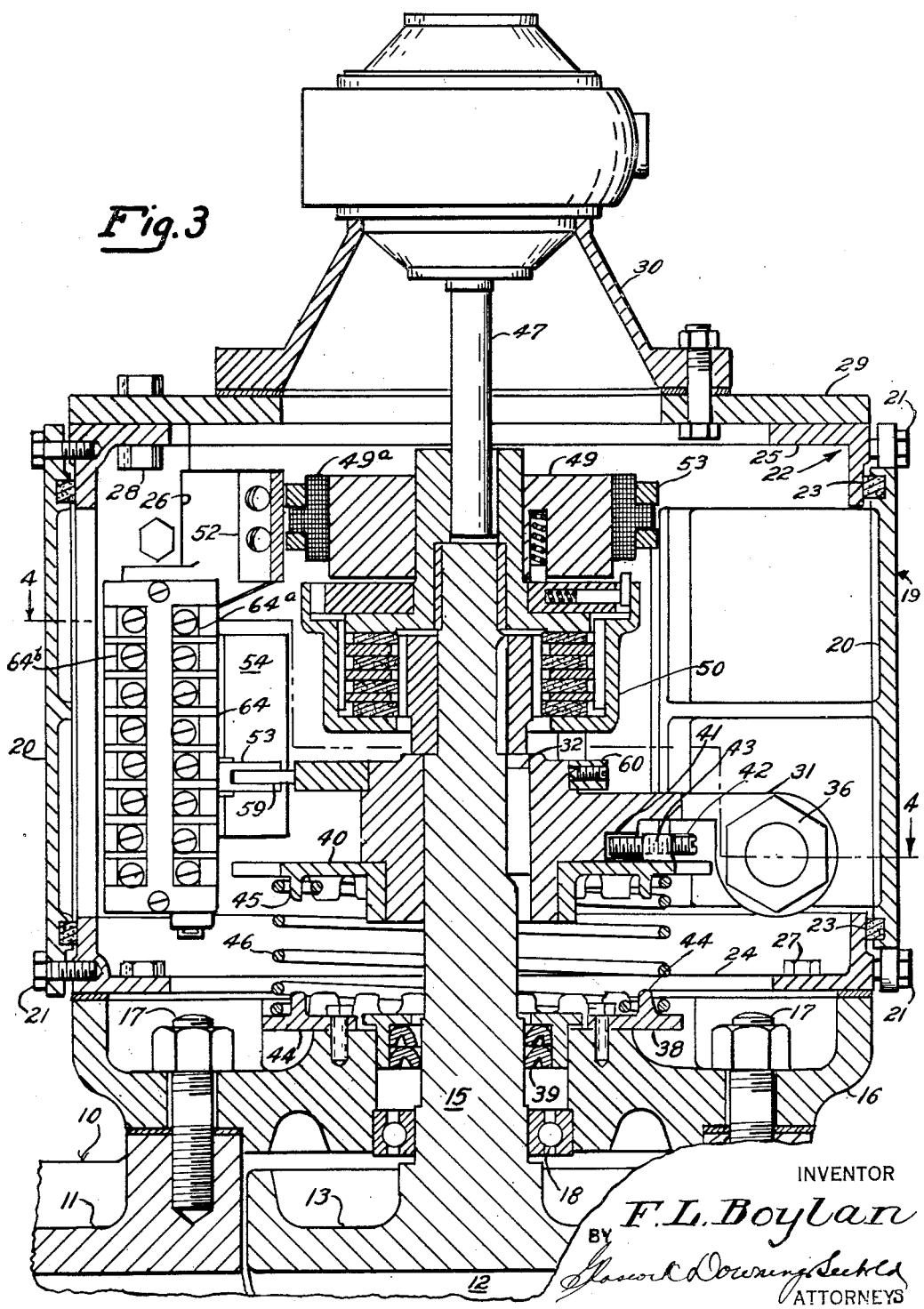
Fig. 3 is a vertical section on the line 3—3 of Fig. 4, in the direction of the arrows.
Figure 4:
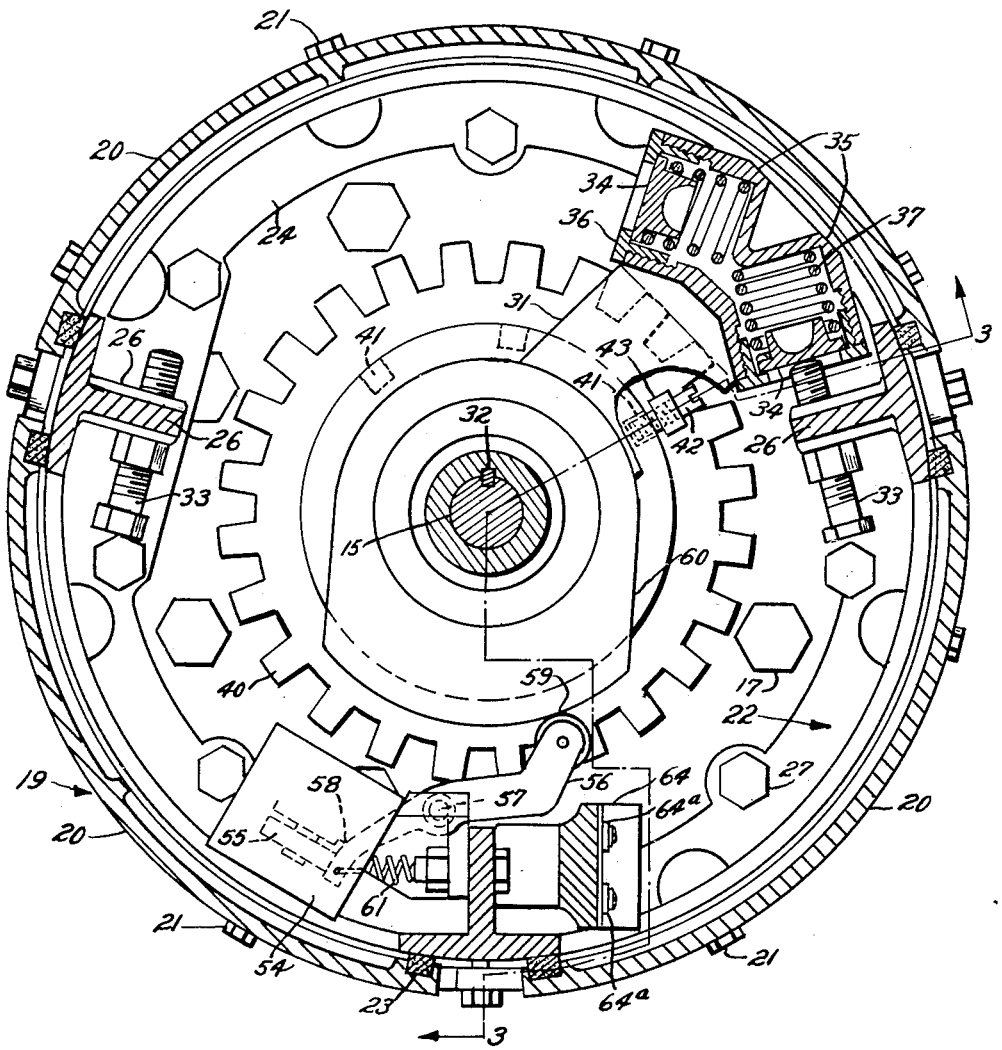
Fig. 4 is a horizontal section on the line 4—4 of Fig. 3, in the direction of the arrows.

Referring to the drawing in detail the valve designated generally at 10 is intended primarily for connection with the standpipe forming part of the tank filling system according to the patent above mentioned wherein the valve is closed by electrically controlled means to build up the fluid pressure during the filling operation and is automatically opened to relieve such pressure either when the tank becomes full or upon failure of the electrical system.

The valve 10 is of the plug type so as to offer very low resistance to the flow of oil in the pipe line and consists of the body 11 having a passage 12 therethrough controlled by the plug 13. The plug 13 is mounted at one end in a ballbearing 14 in the body 11 and is provided at its opposite end with a stem 15 projecting through the cover plate 16 which is bolted at 17 to the body 11, a ballbearing 18 being arranged between the stem 15 and the plate 16.

The plug 13 is preferably mounted in the body 11 with a minimum clearance of approximately ten thousands of an inch so that the plug does not touch the body but rotates freely therein. This permits the valve to leak in the closed position, which is of no consequence considering its intended use, but eliminates danger of the valve sticking.

The valve stem 15 projects into a casing 19 composed of three sectional arcuate walls 20 secured by bolts 21 to a cylindrical frame 22, packing gaskets 23 being located between the frame and the wall. The frame 22 is of open skeleton-like form including annular end members 24 and 25, and connecting ribs of T-section. The annular frame member 24 is secured by bolts 27 to the cover plate 16 and the opposed member 25 is secured by bolts 28 to the supporting plate 29 on which the transmission gear casing 30 is mounted, for a purpose which will hereinafter appear.

The opening and closing movement of the valve plug 13 is limited by a stop arm 31 secured by a key 32 to the valve stem 15 and engageable with limiting screws 33 adjustably mounted in two of the rib 26. The impact of the arm 31 with the screws 33 is cushioned by screw engaging member 34 slidable in opposed sockets 35 provided in the arm 31 and normally pressed against ring nuts 36 by springs 37. The extent of the annular movement of the valve plug 13 in either direction can be varied by appropriate adjustment of the screws 33.

A spring locking plate 38 is bolted to the cover plate 16 and packing 39 is provided at the point where the stem 15 passes therethrough.

A spring adjusting plate 40 is rotatably mounted on the hub part of the arm 31 and is provided with peripheral recesses 41 engageable by a removable pin 42 threaded in a post 43 mounted on the plate 40. The adjacent surfaces of the plates 38 and 40 are provided with laterally projecting lugs 44 and 45, respectively, which are engageable with the looped extremities of a coil spring 46 surrounding the stem 15 and so tensioned as to normally turn the valve plug 13 to open position. The initial tension of the spring 46 may be varied as required by annular adjustment of the spring adjusting plate 40 with respect to the hub of the arm 31 and subsequently securing said plate in position by inserting the pin 42 in such position that it enters one of the recesses 41.

The casing 30 encloses a transmission gear of the worm drive type, the worm wheel being secured to a shaft 47 arranged in alignment with the valve stem 15 and the worm being secured to the shaft 48a of an electric motor 48 suitably secured to the gear casing 30.

The shaft 47 is adapted to be coupled with the valve stem 15 to impart closing movement to the valve plug 13 through a magnetic clutch, the driving member 49 of which is connected with the shaft 47 and the driven member 50 of which is attached to the stem 15. Electrical current for energizing the coil 49a of the magnetic clutch is supplied through brushes 51 mounted on an insulating support 52 and engaging contact rings 53 carried by the driving member 49 of the clutch.

The conductors 48b and 48c supplying current for operation of the electrical motor 48 are controlled by a snap switch 54 suitably supported in the casing 19 and provided with an arm 55 for effecting the opening and closing movement of the switch 54. A lever 56 is pivotally mounted at 57 in the casing 19 and one end thereof designated at 58 is cam shaped and engaged with the switch arm 55. The opposite end of the lever 56 is provided with a roller 59 engaging the cam 60 secured to the arm 31 in such position that as the valve 13 approaches the closed position the cam 60 engages and rocks the lever 56 thereby actuating the switch 54 to interrupt the flow of current to the motor 48. The lever 56 is subjected to the influence of a spring 61 by which the roller 59 is maintained in engagement with the cam 60 and, upon restoration of the valve 13 to open position the lever 56 is rocked about its pivot 57 thereby permitting the snap switch 54 to again close and thus condition the motor circuit for re-energization of motor 48 by the closing of a switch 62 such as disclosed in the patent above referred to.

A suitable conduit 63 for the conductors 48b and 48c connecting the switch 54 with motor 48 is provided and for convenience in making the necessary electrical connections a terminal block 64 with bus-bars 64a and 64b is provided within the casing 19.

Power leads A and B from a suitable source of electric power (not shown) are connected to bus-bars 64a and 64b, respectively, the switch 62 being interposed between the source of power and the terminal block 64. Conductors C and D, from the bus-bars 64a and 64b, respectively, to the switch 54, are connected to conductors 48b and 48c, respectively, when the switch 54 is closed, to energize the motor 48. Conductors E and F, connect the bus-bars 64a and 64b, respectively, with the brushes 51, 51, respectively, on the support 52, contacting the rings 53, 53, to energize the coil 49a of the magnetic switch.

In operation, the valve plug 13 is closed upon simultaneous energization of the magnetic clutch 49—50 and the motor 48 by the closing of the switch 62, the motion of the motor shaft 49a being transmitted through its worm to the worm wheel on the shaft 47 and through the magnetic clutch to the stem 15 and valve plug 13. As the valve plug 13 approaches the closed position the lever 56 is rocked by the cam 60 thereby actuating the switch arm 55 and opening the switch 54 thereby interrupting the circuit of the motor 48 and stopping the motor 48. The closing movement of the valve plug 13 is limited by engagement of the spring pressed member 34 with the related limiting screw 33 and thus the impact of the closing movement is absorbed. The magnetic clutch 49—50 remains energized following interruption in the operation of the motor 48, since the switch 62 is still closed, and the pitch of the the thread of the worm on the shaft 48a is so designed as to provide a non-reversible drive, that is to say, the worm prevents the shaft 47 from moving with the clutched stem 15 under the influence of the spring 46 which constantly tends to move the valve to open position. In accordance with the operation of the electric control of the system referred to in the above mentioned patent, the switch 62 is opened and the circuit connected with the magnetic clutch is interrupted automatically when the tank becomes full and consequently the stem 15 is declutched from the shaft 47 and revolves under the influence of the spring 46 to move the valve 13 to open position. The same operation also occurs in the event of failure of the electrical control for the system and thereby assures reduction in the filling pressure to a safe value.

The valve plug 13 herein disclosed may be arranged in such a position, that the spring 46 for closing the valve plug 13 may be replaced by a weight on the arm 31, the arrangement being such that as the valve plug 13 is closed the weight is raised and falls by gravity upon deenergization of the magnetic clutch so that the valve plug 13 is automatically restored to open position.

What I claim is:

1. In an actuating mechanism for rotating a shaft in both directions, the combination of a housing in which the shaft is journaled; a radial arm keyed on the shaft; a coil spring about the shaft having one end attached to said housing and its other end attached to the shaft; a pair of abutments mounted in said housing for co-action with said arm for limiting the degree of rotation of the shaft in either direction; an electric motor for rotating the shaft; an electric switch for controlling the motor; and means actuated by the shaft for controlling said switch, the parts being so related that when the motor has rotated the shaft in one direction the spring is sufficiently tensioned to rotate the shaft in the opposite direction, and the switch is opened to stop the motor when one of said abutments limits the shaft's movement by the motor, and is closed when the other abutment limits the shaft's movement by the spring.

2. In an actuating mechanism for rotating a shaft in both directions, the combination of a housing in which the shaft is journaled; a radial arm keyed on the shaft; a plate rotatable about the shaft; means for attaching said plate to said arm in selected positions relative the shaft; a coil spring about the shaft, having one end attached to said housing and its other end attached to said plate, the tension of said spring, at rest, being adjusted by positioning said plate relative the shaft; a pair of abutments mounted in said housing for co-action with said arm for limiting the degree of rotation of the shaft in either direction; an electric motor for rotating the shaft; an electric switch for controlling said motor; a lever pivoted in said housing for controlling said switch; and a cam adjustably mounted on said radial arm, for rocking said lever, the parts being so related that when the motor has rotated the shaft in one direction the spring is sufficiently tensioned to rotate the shaft in the opposite direction, and the switch is opened to stop the motor when one of said abutments limits the shaft's movement by the motor, and is closed when the other abutment limits the shaft's movement by the spring.

3. In an actuating mechanism for rotating a shaft in both directions, the combination of a housing in which the shaft is journaled; means to limit the rotation of the shaft in either direction; a driving shaft journaled in said housing; an electromagnetic clutch for drivingly connecting said shafts; an electric motor mounted on said housing; driving means connecting said motor and said driving shaft; a pair of conductors connected to said motor; a second pair of conductors connected to said clutch; a third pair of conductors connected to a source of electric power and to both said first and said second pairs of conductors; an electric switch in said third pair for opening and closing the electric circuit from said source to both the motor and the clutch; a second electric switch in said first pair of conductors for opening and closing the circuit to the motor; a driving spring, connected to the driven shaft, which is tensioned when the motor drives the driven shaft in the one direction, the clutch being energized, and drives the driven shaft in the other direction, after being tensioned, when the clutch is de-energized; and means, actuated by the driven shaft, to open said second switch when the motor rotates the driven shaft to its limit, and to close said second switch when the spring rotates the driven shaft to its limit.

4. In an actuating mechanism for rotating a shaft in both directions, the combination of a housing in which the shaft is journaled; means to limit the rotation of the shaft in either direction; a driving shaft journaled in said housing co-axially with the shaft to be driven; an electro-magnetic clutch having a driving element and a driven element mounted on the driving shaft and the driven shaft, respectively; an electric motor mounted on said housing; a non-reversible worm drive connecting said motor and said driving shaft; a pair of conductors connected to said motor; a second pair of conductors connected to said driving element of said clutch; a third pair of conductors connected to a source of electric power and to both said first and said second pairs of conductors; an electric switch in said third pair for opening and closing the electric circuit from said source to both the motor and the clutch; a second electric switch in said first pair of conductors for opening and closing the circuit to the motor; a driving spring, connected to the driven shaft, which is tensioned when the motor drives the driven shaft in one direction, the clutch being energized, and drives the driven shaft in the other direction, after being tensioned, when the clutch is de-energized; and means, actuated by the driven shaft, to open said second switch when the motor rotates the driven shaft to its limit, and to close said second switch when the spring rotates the driven shaft to its limit.

FRANCIS L. BOYLAN.

REFERENCES CITED

The following references are of record in the file of this patent:

UNITED STATES PATENTS

| Number | Name | Date |
| --- | --- | --- |
| 816,930 | Magnuson | Apr. 3, 1906 |
| 1,234,824 | Tatum | July 31, 1917 |
| 1,848,176 | Jernberg | Mar. 8, 1932 |
| 1,960,973 | Knight | May 29, 1934 |
| 2,222,990 | Shipley et al. | Nov. 26, 1940 |
| 2,430,405 | Millus | Nov. 4, 1947 |